Figure 1:
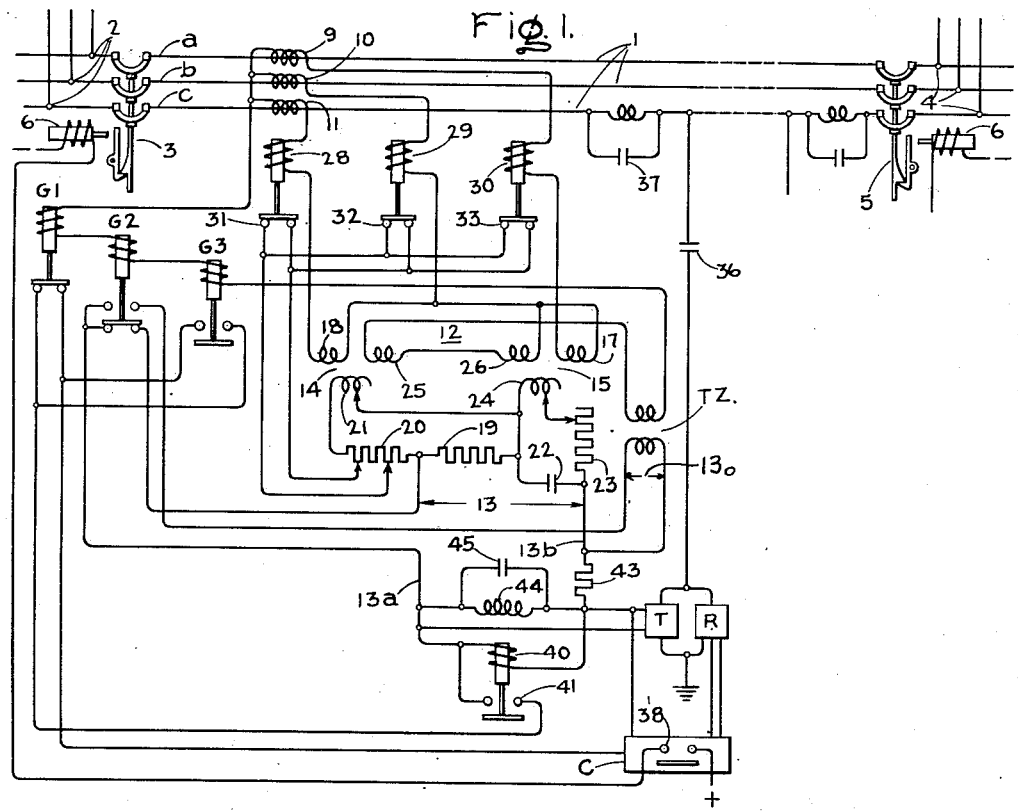

Nov. 7, 1950 A. J. McCONNELL 2,529,169
ELECTRIC PROTECTIVE SYSTEM
Filed Oct. 29, 1949

Inventor:
Andrew J. McConnell,
by Ernest C. Britton
His Attorney.

Patented Nov. 7, 1950

2,529,169

UNITED STATES PATENT OFFICE 2,529,169

ELECTRIC PROTECTIVE SYSTEM

Andrew J. McConnell, Delmar, N. Y., assignor to General Electric Company, a corporation of New York Application October 29, 1949, Serial No. 124,391

3 Claims. (Cl. 175—294)

My invention relates to protective relaying systems for electric power circuits and particularly to such systems of the phase comparison type which utilize a pilot or communication channel to compare the phase relation of two similar alternating current quantities respectively present at two predetermined points of the power circuit, such as the ends of a line section to be protected.

In some protective relaying systems of the phase comparison type, a single phase quantity is derived from the currents in the power circuit conductors at each end of the line section being protected and is arranged during one of its half cycles to effect a predetermined control operation at its respective end of the line section such as the opening of a power circuit breaker at that end if during the same half cycle no blocking signal is received over the communication channel from the other end of the protected line section. During the other half cycle of each derived single phase quantity, a blocking signal is arranged to be transmitted over the communication channel. The relative polarities of the two single phase quantities at the two ends of a line section are such that during an external fault a blocking signal is transmitted over the communication channel from one end during one half cycle and a blocking signal is transmitted over the communication channel from the other end during the other half cycle of each derived single phase quantity so that a substantially continuous blocking signal is transmitted to prevent any control operation from being effected at either end. During an internal fault, however, there is a reversal in the relative polarities of the two derived single phase quantities of approximately 180° so that blocking signals are simultaneously transmitted over the communication channel during one of the half cycles of the single phase quantities and no blocking signal is transmitted during the other half cycle so that a control operation is effected during these other half cycles.

In order to insure proper operation of such a relaying system in response to all kinds of faults that may occur on the power circuit, it is necessary to derive at each relaying point or terminal an alternating current quantity of a sufficient magnitude to effect the proper operation of the relaying system under all kinds of faults that may occur on the protected section irrespective of the number of line conductors involved in the fault. A protective arrangement of the phase comparison type is disclosed and claimed in my United States Patent 2,456,976, granted December 21, 1948, and assigned to the assignee of this invention. In protective arrangements such as that disclosed in the above patent, a single output circuit network is provided whereby a single phase quantity may be derived from the positive, negative and zero sequence currents with all of these components simultaneously affecting the value of the single phase quantity under certain conditions. It is necessary to compare single phase quantities derived at two relaying points, the magnitude and phase angle of which depend principally upon a particular phase sequence quantity at one relaying point and another like phase sequence quantity at another relaying point. In order to insure that the single phase quantities to be compared are derived principally from the derived phase sequence component of the system current at each relaying point, suitable amplifying means have been used in known arrangements to cause the desired phase sequence component at each relaying point to preponderate over other components. Such amplifying means may cause the protective system to be too sensitive so that undesired tripping may occur for an external fault.

An object of the present invention is to provide an improved double output circuit network changeover protective arrangement of the phase comparison type wherein a particular component of the system current is not unduly amplified and wherein one output circuit effective upon ground faults occurring on a protected line section will cause comparison between single phase quantities which vary in accordance with residual current and wherein another output circuit effective upon faults not involving ground will cause comparison between single phase quantities which vary in response to variations in phase sequence components of the system current other than the zero phase sequence component thereof so that a quantity varying in response to variations in residual current due to a ground fault cannot be compared with a quantity varying in response to positive or negative sequence currents.

In accordance with the present invention, a single phase quantity is derived from a polyphase quantity at each relaying point for comparison purposes and means responsive to a function of a zero phase sequence quantity are effective to insure that comparison will be made between a quantity derived from one or more predetermined electrical components of the system at one relaying point and another electrical quantity derived from one or more like predetermined electrical components of the system current at another relaying point so as to insure that comparison will always be made between like rather than unlike quantities. By so doing, I provide an arrangement which affords much greater reliability than prior arrangements.

Figure 2:
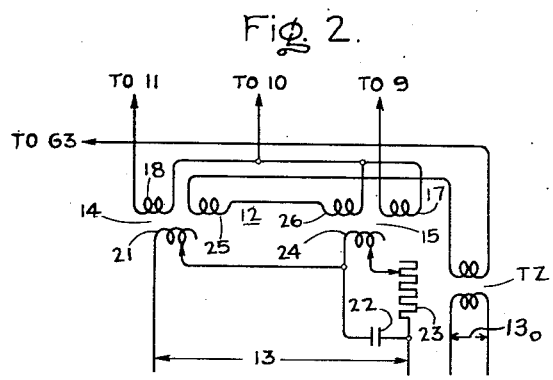

My invention will be better understood from the following description when taken in connection with the accompanying drawing, Fig. 1 of which illustrates a preferred embodiment of my invention in connection with a protective relaying arrangement for one end of a protected line section of an electric power circuit, and Fig. 2 of which is a modification of the phase sequence network shown in Fig. 1, and the scope of my invention will be pointed out in the appended claims.

In the embodiment of my invention shown in Fig. 1 of the drawing, the protected apparatus is a line section 1 of a three-phase power circuit having line conductors $a$, $b$, and $c$. One end of the line section 1 is connected to a bus 2 by a suitable circuit interrupter 3, and the other end of the line section 1 is connected to a bus 4 by a suitable circuit interrupter 5. The circuit interrupters 3 and 5 are respectively provided with trip coils 6 for effecting the opening thereof.

Since the protective equipment at the two ends of the protected line section may be identical, I have shown in detail only that portion of the equipment at the end of the line section 1 which is connected to the bus 2, as is deemed necessary for a clear understanding of my invention. It is to be understood, however, that a similar arrangement of apparatus is associated with the circuit interrupter 5 at the other end of the protected line section 1.

Each end or terminal equipment of the relaying system comprises a bank of three current transformers 9, 10 and 11, respectively connected in series relation with the line conductors $a$, $b$, and $c$ of the protected line section 1 and energizing a double output circuit phase sequence network 12 which is arranged to impress across the first output circuit 13 thereof a single phase voltage which is proportional in magnitude to the negative phase sequence current flowing in the protected line section 1 at the point where the current transformers 9, 10 and 11 are connected thereto and across the second output circuit 13o thereof a single phase quantity which is dependent only upon the presence of zero phase sequence current in conductors $a$, $b$, and $c$.

As shown, the phase sequence network 12 comprises two transformers 14 and 15, and also the transformer TZ each of which is of the type known in the art as a transactor, namely a combined reactor and transformer, which produces an output voltage proportional to the input current. The secondary windings of the current transformers 9, 10 and 11 are connected in star. The secondary winding of the current transformer 9 is also connected in series with a primary winding 17 of the transactor 15 so that the transactor is energized by the current in the line conductor $a$ and a primary winding 26 of transactor 15 is connected to be energized by the residual current in known manner so that the net ampere turns of the primary windings of transactor 15 are equivalent to the current in phase $a$ minus the zero phase sequence current. Likewise, the secondary winding of the current transformer 11 is connected in series with a primary winding 18 of the transactor 14 so that this transactor is energized by the current in the line conductor $c$ and a primary winding 25 of transactor 14 is connected to be energized by the residual current in known manner so that the net ampere turns of the primary windings of transactor 14 are equivalent to the current in phase $a$ minus the zero phase sequence current. A fixed resistor 19 and an adjustable resistor 20 are connected in series across the secondary winding 21 of the transactor 14, and a capacitor 22 and an adjustable resistor 23 are connected in series across the secondary winding 24 of the transactor 15. The capacitor 22 and the resistor 23 are arranged so that the voltage drop across the capacitor 22 lags the secondary voltage of the transactor 15 by 60°. The effective secondary turns of the transactor 15 are such that for the same primary current in the primary windings 17 and 18 the voltage across the capacitor 22 is slightly less than the secondary voltage of the transactor 14. The resistor 20 is adjusted so that the voltage across the resistor 19 under such current conditions in the primary windings 17 and 18 is equal to the voltage across the capacitor 22. The secondary circuits of the transactors 14 and 15 are so interconnected and the output circuit 13 is so connected thereto that with balanced three-phase currents in the line section 1 the voltage across the output circuit 13 is substantially zero and is proportional to the negative phase sequence current in the line section at the point where the current transformers 9, 10 and 11 are connected.

Since it is desirable to have each terminal equipment adaptable for use on a power circuit in which a ground fault on the protected line section may not be sufficient to produce enough negative phase sequence current to cause the network output voltage to reach a desired minimum value, and for the purpose of establishing a single phase quantity which is dependent only upon the presence of zero phase sequence current in conductors $a$, $b$ and $c$, the transactor TZ is provided in the network 12 as well as the ground relays G1, G2 and G3. These ground relays are constructed so that G1 is the most sensitive and G3 is the least sensitive. The primary winding of transactor TZ, being connected in series with the primary windings 25 and 26 of transactors 14 and 15, is energized by residual current. The relays G1, G2 and G3 are arranged with their coils in series with the primary winding of transactor TZ and in series with the windings 25 and 26 so that these relays are responsive to residual current. Operation of relays G1, G2 and G3 causes the conductors 13a and 13b to be energized from the second output circuit 13o supplied by the secondary winding of the transactor TZ rather than from the first output circuit 13 of network 12.

Since a three-phase fault produces substantially no negative phase sequence current in line conductors $a$, $b$ and $c$, substantially no voltage is produced across the output circuit 13 of the network 12 under such fault conditions. In order that a sufficient output voltage may be obtained under such fault conditions, means are provided for changing the connections of the network under such abnormal conditions so that the output voltage of the network is a function of the positive phase sequence current in line section 1 at the point where the current transformers 9, 10 and 11 are connected. In the particular arrangement shown in Fig. 1, the connections of the network 12 are changed during a three-phase fault so that the output voltage is a function of both the positive and negative phase sequence currents in the line section instead of being a function of the negative phase sequence current only. For effecting changes in the output voltage of circuit 13 of the network 12 under three-phase fault conditions, three fault detector relays 28, 29 and 30 are provided, which are respectively connected so as to be responsive to the currents in the phase conductors $a$, $b$ and $c$. As shown, the relays 28, 29 and 30 respectively have windings which are connected in series with the secondary windings of current transformers 9, 10 and 11 and respectively have normally closed contacts 31, 32 and 33 which are connected in parallel in a shunt circuit around a portion of the resistor 20 in the secondary circuit of the transactor 14. Therefore, when a three-phase fault occurs, all three of the relays 28, 29 and 30 open their contacts and effect an increase in the effective portion of the resistor 20 so that the voltage drop across this effective portion of the resistor 20 is increased and the voltage drop across the resistor 19 is decreased. Consequently, the voltage drop across the resistor 19 is no longer equal to the voltage drop across the capacitor 22, and therefore a voltage is obtained across the output circuit 13 under balanced three-phase fault conditions.

In the embodiment of my invention shown in Fig. 1, I utilize the first single phase output circuit 13 of the network 12 during a fault not involving ground and the second output circuit $13_0$ of the secondary winding of transactor TZ during a fault involving ground as a means for controlling the transmission of a suitable high frequency current over one of the line conductors of the protected line section such, for example, as the line conductor $c$, and as a means for controlling the operation of a suitable comparison device C which compares the phase relation of the phase sequence network output voltages of the two ends of the protected line section.

At each end of the protected line section 1, a suitable high frequency transmitter T and a suitable high frequency receiver R are coupled by suitable coupling means such as a capacitor 36 to the line conductor $c$, which is provided at each end thereof with a wave trap 37 to prevent an external fault between the line conductor $c$ and ground from short circuiting the high frequency channel and also to prevent the high frequency current from being transmitted into the adjacent bus. All of the transmitters T and receivers R may be tuned to the same frequency so that each receiver R can receive high frequency current from the transmitter T at either end of the line section or the transmitter T at one end and the receiver R at the other end may be tuned to one frequency and the receiver R at said one end and the transmitter T at said other end may be tuned to a different frequency. At each end of the protected line section 1, a comparison device C is associated with the receiver R and the network output circuits thereat in such a manner as to effect the energization of the associated trip coil 6 during predetermined half cycles of the associated network output voltage if during these same half cycles no high frequency current is received by the associated receiver R. Since pilot relaying systems of the phase comparison type, in which high frequency transmitters are arranged to transmit only during a particular half cycle of a relatively low frequency single phase voltage and in which comparison devices are arranged to effect a predetermined switching operation only when the associated receiver is not receiving high frequency current during the other half cycle of the relatively low frequency single phase voltage, are well known in the art and since my present invention is not limited to the details of such transmitters, receivers and comparison devices they are represented in the drawing by rectangles in order to simplify the disclosure. The comparison device C contains the contacts 38 which are arranged to be closed in response to the occurrence of a half cycle of the voltage of the output circuit 13 during which the associated transmitter T is inoperative if, during that same half cycle, the associated receiver R is receiving no high frequency current from the transmitter T at the other end of the line section 1.

The polarities of the network output voltages at the two ends of the protected line section 1 are such that when fault current flows into one end of the line section and out of the other end, the polarities of the two output voltages are substantially 180° out of phase, and these output voltages control their respective transmitters T in such a manner that during the half cycle when the transmitter T at one end is operative, the transmitter T at the other end is inoperative and vice versa when the transmitter T at said other end is operative, the transmitter T at said one end is inoperative. Consequently, under external fault conditions, high frequency current is continuously transmitted over the line conductor $c$ and the comparison device C at each end of the protected line section is rendered inoperative to close its contacts 38. Under internal fault conditions when currents simultaneously flow into the line section at each end, the polarities of the network output voltages at the two ends of the line section are substantially in phase so that during the half cycle when the transmitter T at one end is operative, the transmitter T at the other end is also operative, and during the half cycle when the transmitter T at said one end is inoperative, the transmitter T at said other end is also inoperative. Consequently, under internal fault conditions during the half cycle when the comparison device C at each end is operative to close its respective contacts 38, it can do so because the associated receiver R does not receive high frequency current during that particular half cycle.

In order to prevent the energization of the associated trip coil 6 in response to network output voltages which are too low to effect the operation of the associated transmitter T on external faults, a fault detector 40 is connected in such a manner as to render the associated comparison device C and the associated trip coil 6 operative only when the voltage of the first network output circuit 13 or the second network output circuit $13_0$ supplied by transactor TZ as the case may be exceeds a predetermined value above the voltage that effects the operation of the associated transmitter T. The fault detector may also be used to effect other control operations such, for example, to give the relaying equipment control of the high frequency channel in the event that it is being used for some other purpose.

As shown, the fault detector 40 is a relay having an energizing winding connected to conductors $13a$ and $13b$ and having contacts 41 in a control circuit for the comparison device C. The relay 40 is arranged to close the contacts 41 when the voltage of the first network output circuit 13 or the voltage of the second output circuit 13o supplied by transactor TZ exceeds a predetermined value. While I have shown the fault detector relay 40 as being connected directly across conductors 13a and 13b, it will be evident to those skilled in the art that in order to minimize the load on the network 12 or on transactor TZ, suitable amplifying means may be interposed between the networks and the fault detector relay winding. Since amplifying means are well known in the art and form no part of my present invention, they have been omitted in order to simplify the disclosure.

Since harmonics in the power circuit current are magnified in secondary currents of the transactors 14 and 15, a resistor 43 is connected in series with the conductor 13b, and a reactor 44 and a capacitor 45 are connected in parallel across the conductors 13a and 13b to form a harmonic filter, the reactor 44 and the capacitor 45 being arranged for parallel resonance at the frequency of the power current flowing in the line section 1 so that very little current of the fundamental frequency flows through the shunt circuit. To currents of harmonic frequencies, however, the parallel impedance of the reactor 44 and the capacitor 45 is relatively low so that the voltage drop produced by these harmonic currents across the resistor 43 is correspondingly high and very little distortion appears in the single phase voltage supplied to the transmitter T, the comparison device C and the relay 40.

The normally closed contacts of relay G1 are interconnected between the contacts 41 of relay 40 and comparison device C. The normally open contacts of relay G3 are connected in shunt relation with the contacts of relay G1. Since relay G1 is more sensitive than relay G3, comparer C cannot operate between the operating values of relays G1 and G3. The normally closed contacts of relay G2 are in series with conductor 13a while the normally open contacts of relay G2 are effective when closed to transfer the connection of conductor 13a from the first output circuit 13 of network 12 to the second output circuit 13o of the network comprising the secondary of the transactor TZ. Since relay G2 is less sensitive than relay G1 but more sensitive than relay G3, the transfer is accomplished at a ground fault current level at which comparer C is inoperative. Although relays G1, G2 and G3 at one end of the protected line have the same nominal operating level, respectively, as G1, G2 and G3 at the opposite end of the protected section, unavoidable differences in adjustment and other errors prevent exactly equal operating levels. By means of the different operating levels of relays G1, G2 and G3, it can be assured that the comparers C at the ends of the protected lines will be operative either when both are energized from output circuit 13 or when both are energized from output circuit 13o supplied by transactor TZ. Thus, by utilizing the relays G1, G2 and G3 together with the transactor TZ, I have provided an arrangement which causes comparison between quantities derived by the network 12 at each relaying point due to phase fault conditions on the one hand or due to ground fault conditions on the other hand. It will be understood that the relays G1, G2 and G3 need not be separate relays but could be combined into one of two devices in known manner.

The operation of the relaying system shown in Fig. 1 will be apparent from the description thereof given above. Under normal load conditions, the output circuit voltage of the phase sequence network 12 is always below the value which effects the operation of the associated detector relay. Also, the contacts of the fault detector relays 28, 29 and 30 are closed under normal load conditions so that the voltage of output circuit 13 of the network 12 is proportional to the negative phase sequence current in the line section at the point where the current transformers 9, 10 and 11 are connected.

Since the contacts 41 of the fault detector relay 40 are open under normal load conditions, the associated comparison device C is inoperative to close its contacts 38, which are connected in the energizing winding of the trip coil 6 of the associated circuit interrupter 3.

When a phase-to-phase fault or a ground fault occurs, the current in each line conductor involved in the fault is sufficient to cause the fault detector relay connected in series relation therewith to open its contacts. However, under such fault conditions, there is always at least one line conductor which is not involved in the fault so that its associated fault detector relay maintains its contacts closed around the normally shunted portion of the resistor 29. Consequently, during a phase-to-phase fault, the output voltage of the network voltage 12 remains proportional to the negative phase sequence current and is unaffected by the positive phase sequence current flowing in the line section at the point where the associated current transformers 8, 9 and 10 are connected. Likewise, the output of the transactor TZ is proportional to the zero phase sequence current.

When a three-phase fault occurs, all three of the fault detector relays 28, 29 and 30 are sufficiently energized to open their respective contacts and thereby change the setting of the network 12 so that the voltage of output circuit 13 thereof is proportional to a function of both the positive and negative phase sequence currents flowing in the line section at the point where the associated current transformers 8, 9 and 10 are connected.

During a phase fault on the power circuit, the voltage of output circuit 13 of the phase sequence network 12 at each end of the line section 1 is sufficient to cause the associated fault detector relay 40 to close its contacts 41 and to render the associated transmitter T operative to transmit a blocking signal during a predetermined half cycle of the output voltage and to render the associated comparison device C operative during the other half cycle of the output voltage. If the fault is outside of the line section 1, the polarities of the two network output voltages at the ends of the line section 1 are such that a blocking signal is transmitted over the line conductor c substantially continuously so that the comparison devices C at the two ends do not close their respective contacts 38. When, however, the fault is within the line section 1, both transmitters T transmit blocking signals only during the same half cycle so that the comparison device C at each end of the line section closes its contacts 38 during the other half cycle and thereby completes through the contacts 41 of the associated fault detector relay 40 an energizing circuit for the trip coil 6 of the associated interrupter. Similarly an internal ground fault causes operation of the interrupters 3 and 5 through the agency of transactors TZ and relays G1, G2 and G3.

The arrangement shown in Fig. 1 has been shown and described with the relays 28, 29 and 30 included as a part of the system. It will be understood, however, that these relays do not form a vital part of this invention. For the sake of completeness, I have shown in Fig. 2 an arrangement identical to that of Fig. 1 except that relays 28, 29 and 30 together with resistors 19 and 20 have been omitted.

Thus the network 12 of Fig. 2 is arranged to derive in the first output circuit 13 a single phase quantity from the polyphase power circuit which varies in response to variations in both the positive and negative phase sequence currents in the polyphase power circuit. Upon the occurrence of a ground fault, the transactor TZ will supply energy to the second output circuit 13₀ and thence to transmitter T and comparer C as in the arrangement shown in Fig. 1.

While I have in accordance with the patent statutes shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. A protective arrangement for a polyphase circuit comprising a network having a first output circuit across which a single phase quantity is produced in response to predetermined fault conditions in said polyphase circuit and a second output circuit across which a single phase quantity is produced in response to fault conditions other than said predetermined fault conditions in said polyphase circuit, control means normally connected to respond to the first output circuit, and means responsive to the single phase quantity produced across the second output circuit for disconnecting the first output circuit from said control means and for connecting the second output circuit to said control means when the single phase quantity produced across the second output circuit exceeds a predetermined value.

2. A protective arrangement for a polyphase circuit comprising a phase sequence network having a first output circuit across which a single phase quantity is produced which normally varies in accordance with a predetermined phase sequence quantity in said polyphase circuit, means responsive to a predetermined fault condition of said polyphase circuit for rendering said first network effective to produce a single phase quantity the magnitude of which varies in response to variations in the magnitude of another phase sequence quantity of the polyphase circuit, said network having a second output circuit across which a single phase quantity is produced which varies as a function of still another phase sequence quantity in said polyphase circuit, control means normally connected to respond to the first output circuit of said network, and means responsive to the single phase quantity produced across the second output circuit of said network for disconnecting the first output circuit of said network from said control means and for connecting the second output circuit of said network to said control means when the single phase quantity produced across the second output circuit of said network exceeds a predetermined value.

3. A protective arrangement for a polyphase circuit comprising a phase sequence network having a first output circuit across which a single phase quantity is produced which varies in response to variations in predetermined phase sequence quantities in said polyphase circuit and a second output circuit across which a single phase quantity is produced which varies as a function of a predetermined phase sequence quantity in said polyphase circuit other than the quantities causing variations in the first output circuit of said network, control means normally connected to respond to the single phase quantity of one of said output circuits, and means responsive to the single phase quantity produced by the other output circuit for disconnecting the one output circuit from said control means and for connecting the other output circuit of said network to said control means when the single phase quantity produced by said other output circuit exceeds a predetermined value.

ANDREW J. McCONNELL.

REFERENCES CITED

The following references are of record in the file of this patent:

UNITED STATES PATENTS

| Number | Name | Date |
|---|---|---|
| 2,160,599 | McConnell | May 30, 1939 |
| 2,419,904 | McConnell | Apr. 29, 1947 |
| 2,456,976 | McConnell | Dec. 21, 1948 |